March 14, 1967 J. J. CULLEN 3,308,651
ULTRASONIC TESTING APPARATUS FOR DETERMINING THE PRESENCE OR
ABSENCE OF MATERIAL WITHIN A TUBULAR MEMBER
Filed March 18, 1964
2 Sheets-Sheet 1

INVENTOR
JAMES J. CULLEN

BY Robert L. Lehman
AGENT

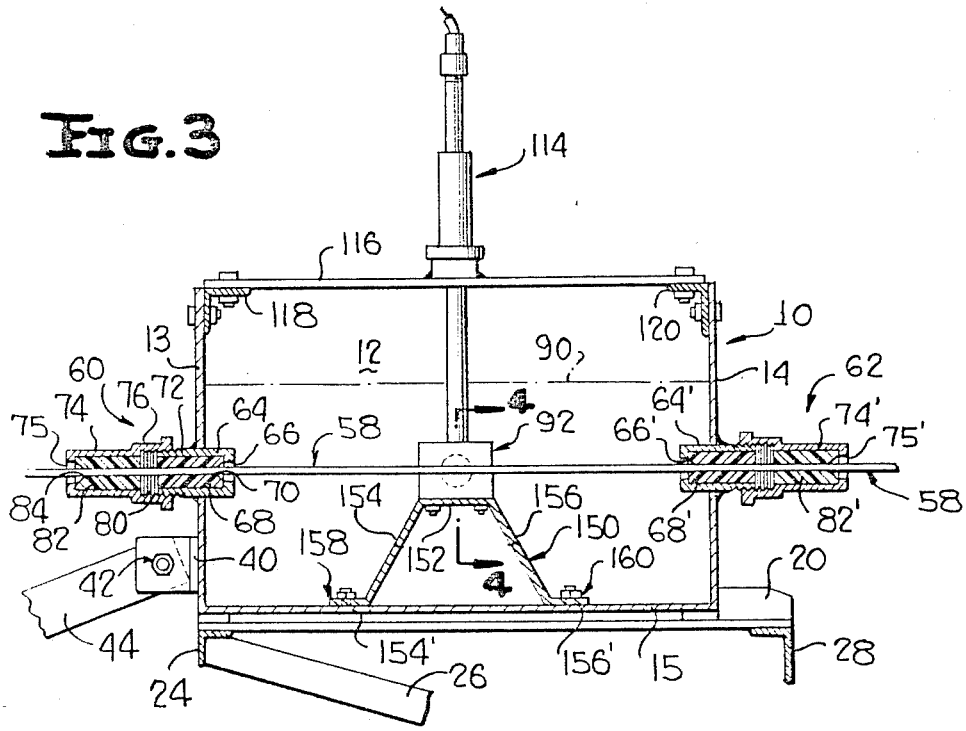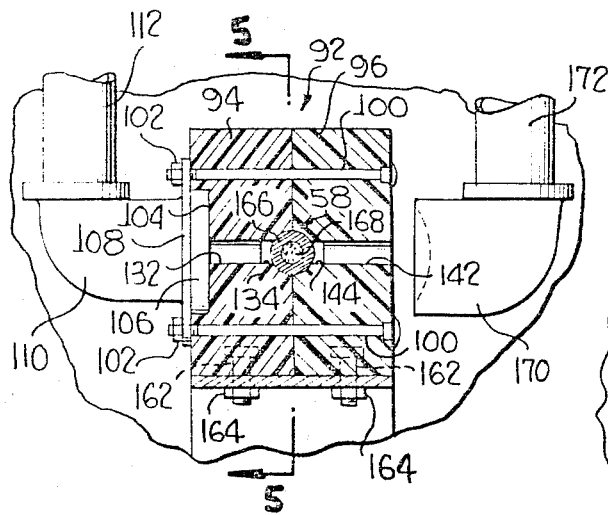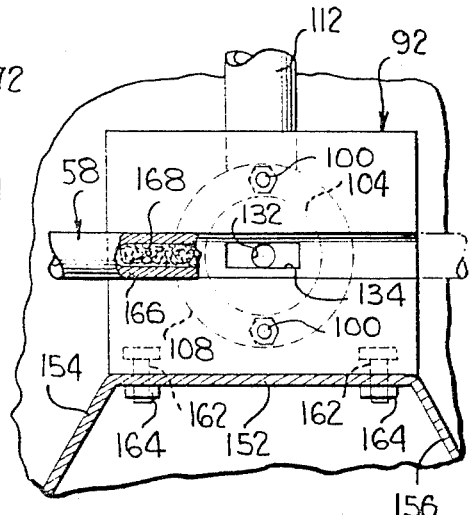

United States Patent Office 3,308,651
Patented Mar. 14, 1967

3,308,651
ULTRASONIC TESTING APPARATUS FOR DETERMINING THE PRESENCE OR ABSENCE OF MATERIAL WITHIN A TUBULAR MEMBER
James J. Cullen, Hazlet, N.J., assignor to National Lead Company, New York, N.Y., a corporation of New Jersey
Filed Mar. 18, 1964, Ser. No. 352,754
5 Claims. (Cl. 73—67.5)

The present invention relates to a new and novel apparatus for determining the presence or absence of material within an elongated member and more particularly to an arrangement fo detecting the presence or absence of flux within the central portion of tubular wire made of solder or other lead based compositions.

The present invention is particularly concerned with the detection of flux within solder wire wherein it is desired to ensure that the flux is substantially free of voids and that the flux extends substantially continuously throughout the bore of the solder wire. It will be recognized that reference is made herein to conventional cored solder wire as is in general use at the present time.

Prior to the instant invention there have been no commercially acceptable methods for detecting voids in the flux contained in solder wire.

The present invention relates to an arrangement wherein the detection of the presence or absence of the flux within the solder wire is accomplished in a continuous manner without damaging or destroying the wire and without the necessity of interrupting the continuous production of the wire. In addition, a further advantageous feature of the present invention is the fact that no additional personnel are required.

In the present invention, the wire is passed, continuously through a container having a body of liquid therewithin, and ultrasonic vibrations are directed toward and through the wire, these vibrations being picked up by a suitable receiver disposed within the liquid which in turn is connected with an indicating means for indicating the presence or absence of the flux within the wire.

With this arrangement, the wire can be monitored without in any manner affecting or damaging the wire and furthermore while the wire is continuously moving through the apparatus such that there is no necessity for interrupting the ordinary continuous manufacturing procedure. The press operator who is normally present for handling the operating mechanism producing the wire can observe the indicating means with a minimum of effort thereby enabling the testing procedure to be carried out without providing any other individuals.

A particular novel feature of the present invention is the provision of a mask means through which the wire passes, this mask means serving the dual function of guiding and of supporting the wire and directing and concentrating the ultrasonic impulses so that they are concentrated in the area of the mask means through which the wire passes to thereby minimize scatter waves and to concentrate the pulse echo so as to increase the over-all sensitivity of the apparatus. With this arrangement, the detection is substantially fool-proof in operation regardless of variations in the wire size, rotation of the wire or any exterior contamination of the wire.

An object of the present invention is to provide a new and novel apparatus for detecting void areas within elongated tubular members and which is particularly adapted to detect the presence or absence of flux within the central portion of solder wire.

Another object of the invention is the provision of a new and novel apparatus for detecting the presence of flux within solder wire without damaging or destroying the wire in any manner or without interrupting continuous production of the wire and which further does not require any additional personnel to operate the apparatus.

Still another object of the invention is to provide new and novel apparatus for detecting void areas within tubular members which is substantially foolproof in operation regardless of variations in wire size, rotation of the wire or exterior contamination of the wire.

A still further object of the invention is the provision of novel apparatus for detecting void areas within tubular members including means for concentrating the pulse echo produced by the ultrasonic transducer and which impinges upon the wire to be tested to thereby increase the over-all sensitivity of the apparatus.

Yet another object of the invention is to provide new and novel apparatus for detecting void areas within tubular members which is quite simple and inexpensive in construction and which may be operated with a minimum of supervision and yet which is quite efficient and reliable in operation.

Other objects and many attendant advantages of the invention will become more apparent when considered in connection with the specification and accompanying drawings, wherein:

FIG. 3 is a sectional view taken substantially along line 3—3 of FIG. 2 looking in the direction of the arrows;

FIG. 4 is a sectional view taken substantially along line 4—4 of FIG. 3 looking in the direction of the arrows;

FIG. 5 is a sectional view partly broken away and taken along the line 5—5 as seen in FIG. 4.

Figure 1:
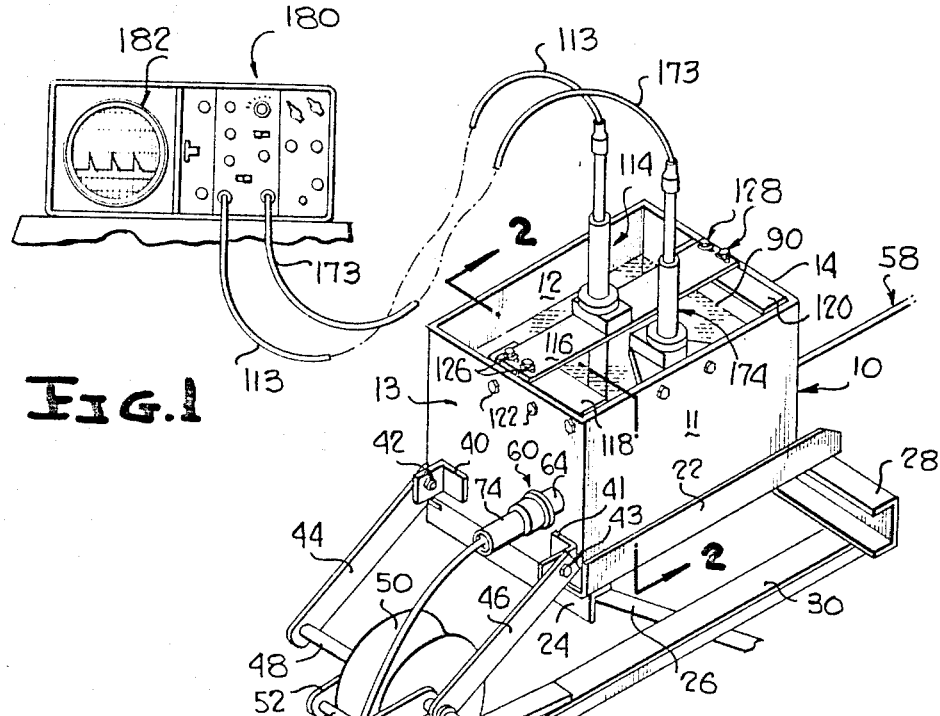
FIG. 1 is a top perspective view illustrating the over-all arrangement of the apparatus of the present invention.
Figure 2:
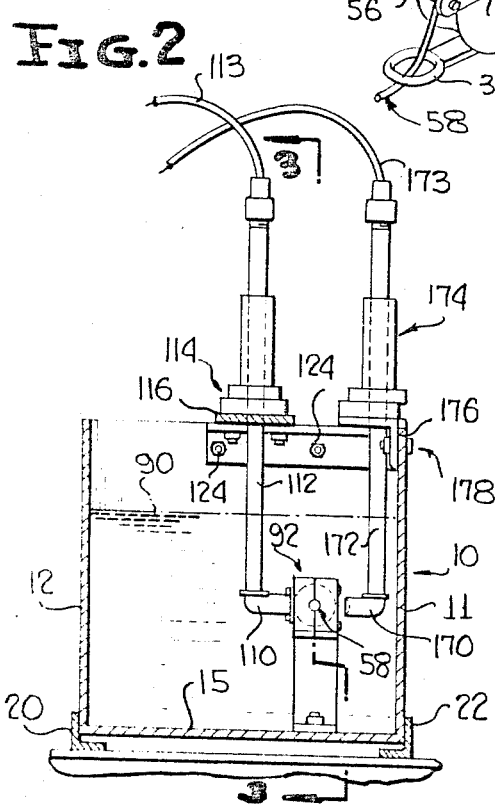
FIG. 2 is a sectional view taken substantially along line 2—2 of FIG. 1 looking in the direction of the arrows.

Referring now to the drawings wherein like reference characters designate corresponding parts throughout the several views, a container is indicated generally by reference numeral 10, this container being substantially liquid-tight and including a pair of opposite side walls 11 and 12, a pair of end walls 13 and 14 and a bottom wall 15, the upper portion of the container being open.

The container is supported by a pair of elongated angle members 20 and 22, the container being secured to these angle members in a suitable fashion such as by welding or the like. The opposite end portions of angle members 20 and 22 are supported by a first cross angle member 24 suitably supported by a depending support member 26, and a channel member 28 which supports the opposite ends of members 20 and 22. Channel member 28 is in turn supported by a suitable support structure, and an angle member 30 is secured to the undersurface of channel member 28 and extends forwardly therefrom as seen in FIG. 1. A member 32 is in turn secured to member 30 and has an eye member 34 secured to the outer end thereof which serves as a guide for the tubular solder wire as hereinafter described.

A pair of bracket members 40 and 41 are suitably secured as by welding or the like to the outwardly facing surface of end wall 13 of the container, these bracket members receiving nut and bolt assemblies 42 and 43 which serve to pivotally supported one end of the arms 44 and 46 respectively. These arms 44 and 46 may be locked in the operative position as shown by tightening the nut and bolt assemblies 42 and 43, and a cross shaft 48 is supported between the outer ends of arms 44 and 46, this cross shaft serving to rotatably support a sheave member 50.

A pair of arms 52 and 54 are secured at end end thereof to the cross shaft 48 and extend outwardly therefrom, it being understood that cross shaft 48 as well as members 42 and 44 will remain in the operative position shown, while the sheave 50 is mounted for rotation with respect to shaft 48. A cross member 56 is supported between the outer ends of arms 52 and 54, and the tubular solder wire 58 is illustrated as being fed in through the eye member 34 thence upwardly about the sheave and beneath the cross member 56 and then into the container. Ports 34 and 56 serve to guide the solder wire in its movement into the apparatus, the sheave of course supporting and guiding the wire to ensure that it will be properly fed into the inlet portion of the apparatus as hereinafter described.

The inlet means to the apparatus is indicated generally by the reference numeral 60, and the outlet means is indicated generally by the reference numeral 62. The inlet and the outlet are substantially identical in construction, and accordingly, the outlet means has been given the same reference numerals primed as the inlet means, and the inlet means will be hereinafter described in detail.

A substantially cup-shaped member 64 is provided which is tightly fitted within a hole provided in end wall 13 and is suitably secured thereto as by welding or the like. Member 64 may be formed of a suitable metal such as steel or the like and is provided with an enlarged hole 66 at the closed end thereof for providing clearance with the solder wire 58.

A substantially cylindrical member 68 is disposed within the hollow interior of member 64 and is formed of a suitable material such as Teflon tetrafluoro-ethylene resin or the like which has the desirable characteristics of being self-lubricating and further which does not corrode or deteriorate in use. Member 68 is provided with a central bore 70 formed therethrough which is adapted to snugly receive and support the solder wire 58 in its movement through the apparatus.

The member 64 is provided with a threaded outer portion 72 at the end thereof. A second substantially cup-shaped member 74 is provided with an enlarged interiorly threaded portion 76 which is adapted to be threaded on the outer threaded portion 72 of member 64. Sealing means is indicated generally by reference numeral 80 and may take the form of one or more felt gaskets 80 which are adapted to be compressed between member 64 and 74 upon threading member 74 onto member 64 to thereby provide the desired liquid-tight seal with the various components associated therewith.

A substantially cylindrical member 82 is disposed within the hollow interior of member 74, and is provided with a bore 84 formed therethrough which is adapted to snugly receive and support wire 58 in its movement through the apparatus. It will be noted that member 74 is provided with an enlarged hole 75 at the closed end thereof for providing clearance with the solder wire.

It is apparent that the inlet and outlet means will readily permit the wire to move through the apparatus, and at the same time will provide a liquid-tight seal therewith so that a body of liquid may be disposed within the apparatus at all times.

As mentioned previously, a body of liquid is disposed within the container at all times of operation and the various components of the apparatus are normally immersed in this liquid. In a typical example, water may be employed as the liquid medium. It is of course apparent that other liquids may be employed as desired, it being essential in any event that there be no gas or air present in any area through which the ultrasonic waves must travel. As illustrated in the drawings, the upper level of this body of liquid is indicated at 90, it being apparent that the operating components are disposed beneath such surface of the liquid.

As the solder wire passes through the apparatus, it is supported and guided in its movement by a mask means indicated generally by reference numeral 92 and including a pair of separate halves 94 and 96. As seen particularly in FIG. 6, mask portion 94 is provided with a pair of holes 98 formed therethrough which are adapted to receive elongated studs 100 which extend through aligned holes provided in the mask portion 96 as seen in FIG. 4, nuts 102 being threaded on the outer threaded ends of the elongated studs as seen in FIG. 4.

The outer face of portion 94 of the mask means is provided with a recessed area 104 which is adapted to receive a conventional immersion type ultrasonic transducer. This transducer is indicated generally by reference numeral 106 and is preferably operated at frequencies between about 0.50 to about 2.35 megacycles. In a typical example, the ultrasonic transducer may be operated at 1.0 megacycle. Above 2.25 megacycles, a flooding condition may occur which would result in too much scattering of the ultrasonic waves and accordingly the accuracy would be diminished.

Referring again to FIG. 4, it will be noted that the transducer 106 is supported within the recessed area 104, and an outwardly extending annular flange 108 which may be secured to the transducer is provided with holes for receiving the elongated studs 100 whereby the transducer is positively secured to the mask means in its operating position as shown.

The transducer means also includes an outwardly extending portion 110 which may be joined wilth an upwardly extending conduit means 112 which has a suitable electrical lead or cable means 113 disposed therewithin.

The conduit means 112 is supported in operative position by a suitable support means indicated generally by reference numeral 114 and which in turn is supported upon a support member 116 the opposite ends of which are supported by angle members 118 and 120 respectively. These members 118 and 120 are connected as by means of the nut and bolt assemblies indicated generally by reference numerals 122 and 124 respectively with the opposite end walls 13 and 14 of the container. Support member 116 may be adjusted laterally of the container since this support member is fixed in position by means of the nut and bolt assemblies 126 and 128 which extend through elongated slots provided at opposite ends of member 116, and these nut and bolt assemblies being in turn operatively connected with the angle members 118 and 120 respectively.

The mask portions 94 and 96 are also preferably formed of Teflon due to the beneficial characteristics of this material as mentioned previously, and the mask serves firstly to guide the solder wire through the equipment and secondly to mask out scatter impulses in the specific area of transmission and reception and to concentrate the pulse echo so that maximum sensitivity is obtained.

Figure 6:
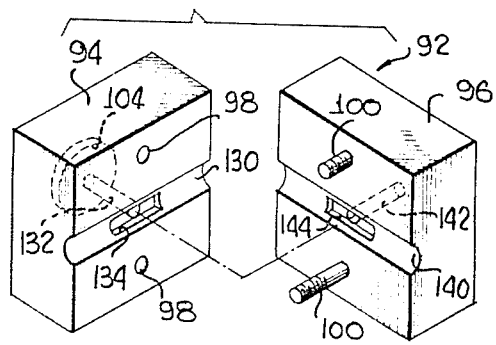
FIG. 6 is an exploded top perspective view of the two portions of the mask means of the apparatus.

Referring specifically to FIGS. 4, 5, and 6, it will be noted that portion 94 is provided with a substantially semicylindrical bore portion 130 extending from one end of the mask portion 94 to the opposite end thereof. A substantially cylindrical transverse bore portion 132 is provided, this transverse bore portion extending from the central area of the recess 104, or in other words from a point adjacent the emission or projection point of the transducer means in the operative position, to the opposite open end thereof which is in communication with the longitudinally extending bore portion 130.

The opposite open end of the transverse bore portion 132 opens into the central part of a recessed portion 134 which is of substantially rectangular configuration as seen in FIG. 6, the long dimension thereof extending parallel with the direction of extent of the bore portion 130. Portion 134 may be termed a "window," and as seen in the figures, this window has a vertical dimension in the position shown which is less than the diameter of the bore portion 130, while the longitudinal extent of the window is substantially greater. In a typical example, the transverse bore portion 132 may be 1/8 of an inch in diameter while the window portion may have a vertical dimension as shown in the drawings of 1/8 of an inch and a longitudinal dimension of 3/8 of an inch.

In any event the transverse bore portion 132 should have a diameter corresponding to the diameter of the core wtihin the particular wire being tested.

In a similar manner, the mask portion 96 is provided with a substantially semi-cylindrical bore portion 140 which cooperates with the bore portion 130 when the two halves of the mask 94 and 96 are in operative position to provide a substantially cylindrical bore through the over-all mask means. The diameter of this longitudinally extending bore is substantially the same as the outer diameter of the solder wire such that the solder wire will be snugly received within this bore and will be guided and supported in its movement through the mask means.

Mask portion 96 is provided with a transverse bore portion 142 which extends from the outer face thereof to the open inner end thereof which is in communication with the longitudinally extending bore portion 140. The inner open end of transverse bore portion 142 axially opens into the central area of a recessed portion or window 144 which may be of substantially rectangular configuration as seen in FIG. 6 and which is of the same relative dimensions as the other window portion 134 previously described.

It is apparent that when the mask portions are in the operative position as shown in FIG. 4 that the window portions 134 and 144 are disposed at diametrically opposite portions of the longitudinal bore formed through the mask means.

As mentioned previously, the mask means serves to mask out scatter impulses, and the material of the mask means is specifically chosen to perform this function. Obviously, other materials than that specifically mentioned hereinbefore may be employed for this purpose if they have the necessary characteristics. The mask means is so designed that the ultrasonic impulses or vibrations will go through the center portion of the longitudinal bore and any impulses traveling radially around the upper and lower portions of the wire tending to produce scatter sound waves will be minimized, and the pulse echo will be concentrated through the center chamber thereby increasing the over-all sensitivity of the apparatus.

Because of vibration and other forces present during the operation of the machine wherein the wire is being continuously drawn through the apparatus, it is necessary that an extremely rigid construction be employed. It is apparent that the two halves of the mask means when in assembled relationship as shown in FIG. 4 are held rigidly together by means of the elongated studs 100. In addition, the entire mask means is rigidly supported by the container. For this purpose, a support means indicated generally by reference numeral 150 is provided.

Support means 150 includes an upper substantially flat support portion 152 and a pair of downwardly projecting support legs 154 and 156 which terminate in laterally extending foot portions 154' and 156' which are in turn suitably secured to the bottom wall 15 of the container as by stud and nut assemblies 158 and 160 respectively.

Each of the mask portions 94 and 96 is provided with a pair of spaced bolts 162 which are embedded in the material thereof and with the threaded lower ends thereof depending therefrom. These threaded lower ends of the bolts extend through suitable holes provided in the upper portion 152 of the support means 150, and nuts 164 are threaded on the lower threaded ends of these studs for retaining the mask means in rigid position upon the support means 150.

As seen in FIGS. 4 and 5, the solder wire 58 includes the outer tubular portion 166 formed of solder or other lead or lead alloy compositions, and the inner core portion 168 is formed of conventional flux as utilized in this type of construction. Flux as employed may for example be the conventional rosin base (organic type) and zinc chloride base (inorganic type). The only requirement is that the flux composition allow passage of ultrasonic waves therethrough. It will be seen that the ultrasonic vibrations will be directed and concentrated by the mask means in the central portion of the bore through which the wire extends, and accordingly maximum sensitivity of the apparatus will be obtained.

A receiver 170 may comprise an ultrasonic impulse receiver operating at the same frequency as the transducer means, and in a typical example may be operated at 1.0 megacycle. This receiver is supported at the lower end of a conduit 172 within which is provided the electrical lead or cable 173. Conduit means 172 is supported by a support means 174 which in turn is mounted on an angle member 176 secured to the side wall 11 of the container by suitable nut and bolt assemblies 178.

The electrical leads or cables 113 and 173 are connected with a conventional ultrasonic transmitter and receiver indicated generally by reference numeral 180 and which includes a conventional viewing screen or oscilloscope 182. In order to operate the apparatus, the oscilloscope pattern must first be standardized by establishing a standard pattern or back reflection on the oscilloscope. In a typical example, the signal which is received to provide a standard pattern to show that the core of the solder wire does contain the flux constituent and that there are no voids may yield what can be termed a full-scale blip, or in other words a vertical pattern having at least one peak extending nearly to the top of the oscilloscope screen.

When the flux is absent within the wire the passage of the ultrasonic waves will be interrupted or minimized and the received signal as shown on the oscilloscope will be significantly different and will not contain any high peak corresponding to that of the reference pattern. In other words, the highest peak will in no sense compare to that of the reference pattern, and an observer will be immediately apprised of the fact that a void is present within the wire. The standardization of the instrument is necessarily empirical, and voids may be purposely established in the wire to determine the differences in pattern when flux is present and when it is absent from the wire. The patterns will also have to be empirically determined for different diameters of wire and when different flux compositions are employed.

When a visual indicating means has been illustrated, it is apparent that an audio alarm may be employed if desired such that when the received signal diminishes or changes, the audio alarm will be set off. In addition, it is also apparent that the detection circuit may include an electrical control so as to automatically interrupt or stop movement of the wire through the apparatus so as to enable the faulty section of the wire to be cut out or otherwise disposed of.

While the receiver means has been illustrated as being spaced from the mask means, it should also be noted that the receiver means may be disposed in abuttting relationship with the mask means if deemed desirable. When small diameter wire is employed it is found preferable to space the receiver apart from the mask means so as to utilize the full diameter of the receiver head or crystal and thereby to increase the sensitivity. In any event, it is necessary that the receiver means be aligned with the transverse bore means including the bore portions 132 and 134 so as to receive the ultrasonic impulses transmitted by the transmitter and passing through the area within which the wire is disposed during operation of the apparatus.

It should be noted as seen particularly in FIGS. 4 and 5 that the mask means, which is a precision machine article, provides an opening in the form of the window portions 134 and 144 for the passage of the ultrasonic impulses or waves which has a vertical dimension as shown substantially equal to the vertical dimension of the cavity or bore within the wire. With this arrangement, the transducer is masked such that ultrasonic impulses are directed only through the cavity or bore area of the wire, while any impulses which may tend to travel radially around the upper and lower portions of the wire are masked thereby minimizing scatter sound waves and concentrating the pulse echo through the central hollow area of the wire thus increasing the over-all sensitivity of the apparatus.

It is apparent that the mask means may be removed and exchanged for other mask means when wires of a different diameter or having a different size bore therewithin are employed. Accordingly, the apparatus is adapted to be utilized with wires of varying size and composition.

It is additionally evident that the position of the transducer itself may be adjusted through the intermediary of the adjustable support portions 114 and 116. Also, as mentioned previously, the mask means may be disposed either in spaced relationship to the receiver 170 or in abutting relationship thereto as desired.

In operation, the wire 58 is fed inwardly through the inlet portion 60, thence through the central longitudinally extending bore defined by the mask means, and finally out through the outlet portion 62 of the apparatus.

The operation can then be substantially continuously carried out wherein the wire 58 is fed continuously through the apparatus and the desired information may be obtained without in any way damaging or destroying the wire. Furthermore, it is not necessary to interrupt the production of the wire in order to make such tests, and the passage of the wire need only be interrupted if a faulty area is detected wherein voids may be present within the wire. Furthermore, the press operator may observe the oscilloscope, and it is not necessary to provide any additional personnel.

As the wire moves through the mask means, the absence of flux in the interior core portion of the wire will produce a substantial change in the pattern shown on the oscilloscope screen thereby immediately informing the operator that voids exist within the wire. Such change in pattern will of course be predicated upon the inability of the ultrasonic waves to pass through a void section.

It is apparent that the ultrasonic transducer will be continuously operated so as to provide the desired impulses which are directed toward the wire and the receiver, the mask means serving to concentrate the pulse echo through the core portion of the wire.

The receiver is of course arranged to continuously receive ultrasonic impulses as they may pass through the cored wire and to relay the information to the indicating means, whether it be visual, audio or of any other nature.

It is apparent from the foregoing that there is provided a new and novel apparatus for detecting void areas within elongated tubular members and which is particularly adapted for detection of the presence or absence of flux within the core portion of solder wire. The desired end results can be obtained without damaging or destroying the wire or interrupting the production procedure, and without the necessity of providing additional personnel. The apparatus is substantially foolproof in operation and it is apparent that the process can be carried out even by relatively inexperienced personnel. Furthermore, the operation is substantially independent of variations and wire size, rotation of wire and exterior contamination. The mask means serves to concentrate the pulse echo produced by the ultrasonic transducer such that the ultrasonic impulses are directed only through the central core portion of the wire to thereby increase the over-all sensitivity. The apparatus is quite simple and inexpensive in construction and operation, and yet is quite efficient and reliable.

It should again be emphasized as is evident from the foregoing that there must be continuous maintenance of rigidity and alignment between the cooperating parts of the apparatus during operation.

As this invention may be embodied in several forms without departing from the spirit or essential characteristics thereof, the present embodiment is therefore illustrative and not restrictive, and since this scope of the invention is defined by the appended claims, all changes that fall within the metes and bounds of the claims or that form their functional as well as conjointly cooperative equivalents are therefore intended to be embraced by those claims.

I claim:

1. Apparatus for determining the presence or absence of material within an elongated member comprising a container, a body of liquid disposed within said container, said container including inlet means and outlet means aligned with one another, mask means supported within said container and having a first bore formed therethrough in alignment with said inlet and outlet means for snugly receiving an elongated tubular member having a core material therewithin, said tubular member passing through said inlet means, thence through said bore and then outwardly of the apparatus through said outlet means, said mask means including a second bore of less diameter than said first bore formed therethrough intersecting said first bore and disposed substantially perpendicularly thereto, said mask means including a recessed portion at one end of said second bore, an ultrasonic transducer having at least a portion thereof disposed within the recessed portion of said mask means and supported thereby, ultrasonic pulses being directed through said second bore as a beam, and substantially all of said beam being transmitted through the core material of said elongated member disposed within said first bore, said transducer means being disposed at one end of said second bore and the opposite end of said second bore being open, ultrasonic transducer receiver means disposed in alignment with said second bore and the open end thereof for receiving ultrasonic impulses from said open end, said first bore being positioned directly between said transducers, and indicating means operatively connected with said receiver means for providing an indication of the presence or absence of material within the elongated member disposed within the bore of said mask means.

2. Apparatus as defined in claim 1 wherein each of said inlet means and said outlet means includes a guide portion for supporting and guiding an elongated member and a sealing means for providing a liquid-tight seal with respect to the elongated member passing therethrough.

3. Apparatus as defined in claim 1 including a support means secured to said container and adapted to support said mask means in rigid position within said container, and support means for both said transduced means, said last-mentioned support means also being supported by said container.

4. Apparatus as defined in claim 1 wherein said second bore includes enlarged recessed portions formed immediately adjacent said first-mentioned bore at diametrically opposite sides thereof, said enlarged portions each being of substantially elongated rectangular configuration with a major dimension thereof extending along the length of said first bore, said second bore intersecting said enlarged portions at substantially the central areas thereof.

5. Apparatus as defined in claim 1 wherein said transducer receiver means is supported within said container in spaced relationship to said mask means.

References Cited by the Examiner

UNITED STATES PATENTS

| 2,655,035 | 10/1953 | Erwin | 73—67.3 |
| 2,966,056 | 12/1960 | Heller | 73—67.6 |
| 3,183,709 | 5/1965 | Rankin et al. | 73—67.5 |
| 3,229,508 | 5/1966 | Sharpe et al. | 73—67.5 |

RICHARD C. QUEISSER, *Primary Examiner.*

JOHN P. BEAUCHAMP, *Assistant Examiner.*